No. 651,864. Patented June 19, 1900.
J. B. KELLY.
PISTON.
(Application filed Feb. 8, 1900.)
(No Model.)
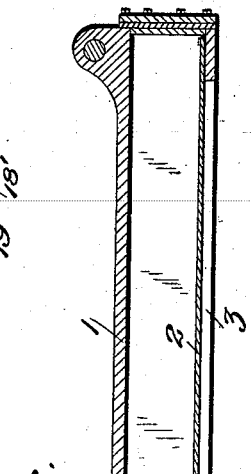
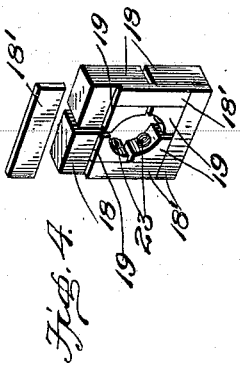
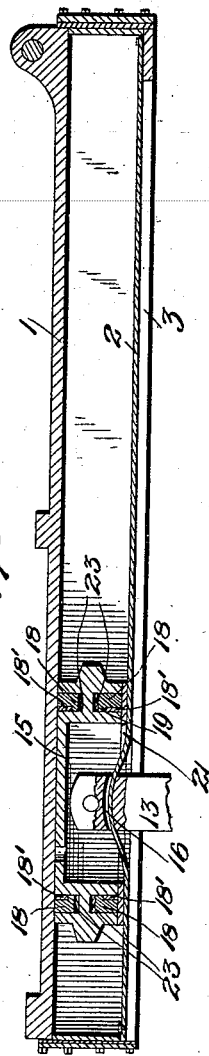
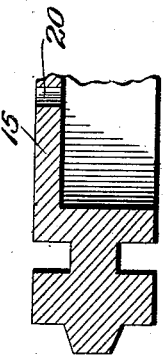
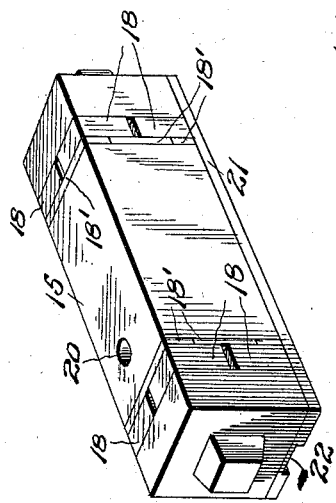
Witnesses
Inventor
John B. Kelly
by H. B. Willson & Co.
Attorneys

UNITED STATES PATENT OFFICE.

JOHN B. KELLY, OF PORTLAND, OREGON, ASSIGNOR OF ONE-HALF TO CHARLES L. VAN BUSKIRK, OF LODI, CALIFORNIA.

PISTON.

SPECIFICATION forming part of Letters Patent No. 651,864, dated June 19, 1900.

Original application filed November 9, 1899, Serial No. 736,345. Divided and this application filed February 8, 1900. Serial No. 4,491. (No model.)

*To all whom it may concern:*

Be it known that I, JOHN B. KELLY, a citizen of the United States, residing at Portland, in the county of Multnomah and State of Oregon, have invented certain new and useful Improvements in Pistons; and I do declare the following to be a full, clear, and exact description of the invention, such as will enable others skilled in the art to which it appertains to make and use the same.

This invention relates to piston-packings, and more particularly to packings for pistons polygonal in cross-section which are adapted to cylinders of a corresponding cross-section, and particularly designed for use with an engine-cylinder such as is shown in an application for patent filed by me November 9, 1899, Serial No. 736,345, of which this application is a division.

The object of the invention is to provide a piston of this type which will have a steam-tight joint with the walls of the cylinder and maintain this steam-tight joint by automatically taking up or compensating for the wear between the parts.

To this end the invention consists in certain features of construction and combination of parts, which will be hereinafter fully described and claimed.

In the accompanying drawings, Figure 1 is a perspective view of my improved piston. Fig. 2 illustrates its application to a cylinder square in cross-section. Fig. 3 is a sectional view of one end of the piston before it has been packed. Fig. 4 is a detail perspective view of the packing blocks and strips.

In the drawings the same reference characters indicate the same parts of the invention.

1 denotes the cylinder, provided in one of its sides, preferably its lower side, with a longitudinal slot 2, covered by a metal band 3, arranged within the cylinder and suitably secured at its ends thereto. 15 denotes a piston mounted to reciprocate within said cylinder and provided with an attaching-arm 13, which extends through the cylinder and is adapted to be secured to the part, device, or machine to be operated. This attaching-arm has an eye or aperture 16, through which the band 3 projects. The piston is polyonal in cross-section and preferably consists of four sides. At or near the ends of the piston are formed annular grooves, in which are placed angular packing-blocks 18, having shoulders 19. These blocks are fitted in the grooves at each end of the piston. Packing-strips 18' have their inner edges seated against the shoulders 19 and arranged to break joint with the angular blocks, as more clearly shown in Fig. 4. Coil-springs 23 are provided and exert their energy to force said packing-blocks outward against the sides of the cylinder, and thereby prevent any leakage of steam past the ends of the cylinder. While the packing-blocks are designed for this purpose, it is possible that steam may pass between the ends of the piston and be confined between the packing-blocks, the upper side of the piston, and the upper side of the cylinder, thus exerting a load upon the piston. In order to prevent the accumulation of steam at this point, I form a hole 20 in the upper wall of the piston to allow of the escape of steam should it work past the packing-blocks.

The lower side of the piston may, if desired, be provided with a wearing-shoe 21, grooved at 22, so as to straddle the band or tape 3 and prevent the wearing of the same.

From the foregoing description, taken in connection with the accompanying drawings, the construction, operation, and advantages of my improved piston will be readily apparent without requiring an extended explanation.

It will be seen that the device is simple of construction, that said construction permits of its manufacture at small cost, and that it is exceedingly well adapted for the purpose for which it is designed.

Various changes in the form, proportion, and the minor details of construction may be resorted to without departing from the principle or sacrificing any of the advantages of this invention.

Having thus described the invention, what is claimed, and desired to be secured by Letters Patent, is—

1. The combination with the longitudinally-slotted cylinder and a tape or band to cover said slot; of a piston arranged therein and provided with a wearing-shoe having a groove to straddle the band or tape, said piston being formed with grooves near its ends, angular packing-blocks inserted in said grooves, plates or strips arranged to break joint with the angular blocks, and springs for pressing the angular blocks outwardly, substantially as and for the purpose set forth.

2. The combination with the longitudinally-slotted cylinder; of the flexible strap arranged within the cylinder to cover said slot; a piston arranged within said cylinder and provided with an attaching-arm, having a guide eye or aperture through which the flexible strap passes, and a wearing-shoe secured to said piston and having a groove, the walls of which straddle said strap, substantially as set forth.

3. The combination with a longitudinally-slotted cylinder, of a flexible strap arranged within the cylinder to cover said slot, and a piston arranged within said cylinder and provided with an attaching-arm having a guide eye or aperture through which the flexible strap passes, the base of said piston being provided with a longitudinal groove, the walls of which straddle said strap, substantially as set forth.

In testimony whereof I have hereunto set my hand in presence of two subscribing witnesses.

JOHN B. KELLY.

Witnesses:
WM. A SHRYOCK,
WM. K. SHRYOCK.